July 4, 1972  J. W. SHAFFER  3,674,411
PHOTOFLASH LAMP
Filed Dec. 29, 1969
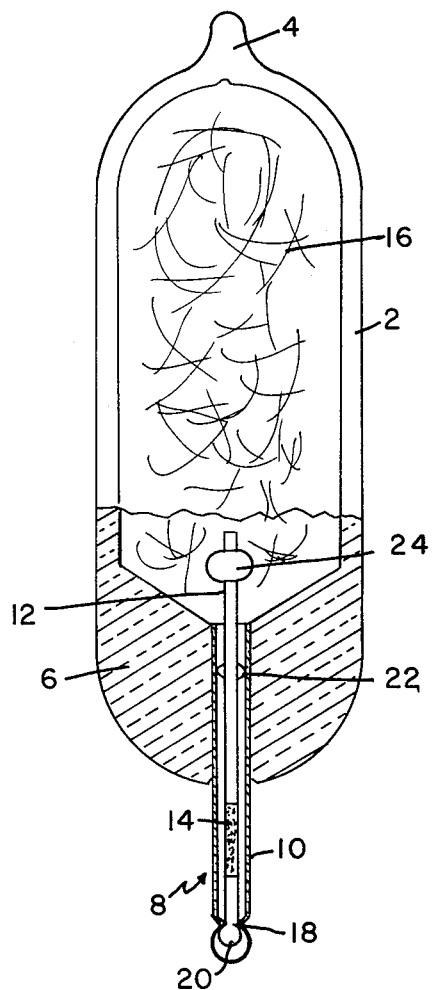
JOHN W. SHAFFER
INVENTOR
BY Joseph C. Ryan
ATTORNEY United States Patent Office 3,674,411
Patented July 4, 1972

3,674,411
PHOTOFLASH LAMP
John W. Shaffer, Williamsport, Pa., assignor to
Sylvania Electric Products Inc.
Filed Dec. 29, 1969, Ser. No. 888,599
Int. Cl. F21k 5/02
U.S. Cl. 431—93
9 Claims

ABSTRACT OF THE DISCLOSURE

A percussive-type photoflash lamp in which the powdered metallic combustible component of the filminating material thereof is titanium.

---

This invention relates to the manufacture of photoflash lamps and more particularly those of the percussive type.

Generally speaking a percussive-type photoflash lamp comprises an hermetically sealed, light-transmitting envelope containing a source of actinic light and having a primer secured thereto. More particularly, the percussive-type photoflash lamp may comprise a length of glass tubing constricted to a tip at one end thereof and having a primer sealed therein at the other end thereof. The length of glass tubing which defines the lamp envelope contains a combustible such as shredded zirconium foil and a combustion-supporting gas such as oxygen. The primer may comprise a metal tube and a charge of fulminating material on a wire supported therein. Operation of the percussive-type photoflash lamp is initiated by an impact onto the tube to cause deflagration of the fulminating material up through the tube to ignite the combustible disposed in the lamp envelope.

The requirements that must be met by a fulminating material for percussive flashlamps are unique and differ appreciably from those for flashlamps used heretofore in which a paste of fulminating material is heated by the passage of electric current through a wire filament until ignition occurs. Energy input to the paste usually extends over a period of one or more milliseconds. In contrast, energy input to the fulminating material of a percussive flashlamp is in the form of a single nearly-instantaneous impact, the duration of which would be measured in microseconds. Unless ignition occurs during this single momentary event, the lamp has failed. Accordingly, the fulminating material for percussive flashlamps must be much more sensitive than is the ignition paste for filament-ignited lamps. This necessary sensitivity is achieved by the use of red phosphorus and potassium chlorate, mixtures of which burn with explosive violence once ignited.

Often the high velocity flow of gas resulting from deflagration of the fulminating material would impinge on the shredded combustible, forming it into a compact mass located in the dome of the lamp. The combustion of such compacted shreds is very inefficient and the light output of the lamp does not attain its desired value. This explosiveness may be moderated somewhat by the addition of a metallic powder to the mixture. The degree of moderation realized depends upon the type and relative quantity of metal powder used.

A number of different metallic powder and various quantities thereof have been employed heretofore and with varying degrees of success. Initially zirconium powder was used. However, it was soon discovered that as zirconium was added, ignition reliability fell off long before sufficient moderation was attained. In sufficient fulminating material moderation usually results in tight compacting of the shredded combustible. This causes poor light output and can lead to containment failures. Further investigations showed that improvements in the system could be obtained by using silicon or boron in place of zirconium. However neither of these materials seemed able to give a sufficiently high degree of reliability of the transport of combustion from the fulminating material to the shredded foil. A mixture of powdered boron and zirconium seemed to give improved shred ignition performance while retaining a reasonably satisfactory degree of moderation on the red phosphorous-chlorate reaction.

During manufacture, a coating of fulminating material is applied to the wire anvil by a dip process. The fulminating material in the area of the anvil head and crimp is then washed off. As in all such processes, the resulting weight of fulminating material that remains on the anvil may vary from one sample to another. When the process is set so as to give a desired average weight, some small percentage of anvils sometimes retain only about one-half or two-thirds of the desired quantity. In these circumstances usually the lamp underwent primer flash without subsequent shred ignition.

This problem of shred ignition failures could be eliminated by increasing the average weight of fulminating material per lamp. However, this is not a satisfactory solution because both lamp light output and containment would be affected adversely. The weight of the fulminating material that can reasonably be incorporated into each lamp is also severely limited by the dimensional clearance betwen anvil and tube. The fulminating material should not touch the inner wall of the metal tube because, if it does, the slightest bump or vibration could flash the completed lamp prematurely. On the other hand, a larger anvil-to-tube spacing would increase the required impact energy prohibitively because a deeper tube indent would be required to compress the fulminating material against the anvil.

In view of the foregoing, one of the principal objects of this invention is to provide an improved fulminating material for percussive flashlamps that ignites the shredded combustible foil in the lamp envelope more reliably than the fulminating materials used theretofore.

Another object is to provide a fulminating material that ignites more reliably under conditions of low impact energy.

A further object is to provide a fulminating material that is less subject to selective particle settling.

A further object is to provide a fulminating material that will contribute to better lamp photometric output and freedom from shred compaction.

These and other objects, advantages and features are attained, in accordance with the principles of this invention, by the use of powdered titanium in the fulminating material of percussive flashlamps. I have found that titanium gives a moderation favorably comparable to the best of the several materials suggested heretofore and at the same time gives significantly improved reliability of shred ignition. In addition, it also gives greater flash relability at low impact energies. Lamp containment and photometric results obtained with titanium-based fulminating material are very good and compare favorably with the best results obtained heretofore with other materials. In addition, because of its lower density than some materials used heretofore, it is characterized by a slower settling rate during the application process described above and this helps to keep the fluid fulminating material homogenous and results in optimum lamp-to-lamp uniformity.

In the specific embodiment of the invention illustrated in the accompanying drawing, the figure is an elevational view partly in section of a percussive-type photoflash lamp. The lamp comprises a length of glass tubing defining an hermetically sealed lamp envelope 2 constricted at one end to define an exhaust tip 4 and shaped to define a seal 6 about a primer 8 at the other end thereof. The primer 8 comprises a metal tube 10, a wire anvil 12 and a charge of fulminating material 14. A combustible such as filamentary zirconium 16 and a combustion-supporting gas such as oxygen are disposed within the lamp envelope. The wire anvil 12 is centered within the tube 10 and held in place by a crimp 18 just above the head 20 of the anvil. Additional means, such as lobes 22 on wire anvil 12, are also used to aid in stabilizing and supporting it substantially coaxial within the primer tube 10 and insuring clearance between the fulminating material 14 and the inside wall of the tube 10. A refractory bead 24, fused to the wire anvil 12 just above the inner mouth of the primer tube 10, eliminates burn-throughs and functions as a deflector to deflect and control the ejection of hot particles of fulminating material from the primer tube.

By way of example, a titanium-based fulminating material for percussive flashlamps in accordance with the principles of this invention may have the following dried composition: titanium powder, 48.01%; potassium chlorate, 24.85%; red phosphorus, 24.85%; hydroxyethylcellulose, 1.30%; magnesium oxide, 0.66%; sodium lignin sulfonate, 0.23%; sodium 2-ethyl-hexylsulfate, 0.03%; trichlorophenol, 0.04%; and sulfur, 0.03%. The percentage of titanium may be varied from about 10% to about 90%. At high titanium contents, the fulminating material deflagration is very gentle but ignition reliability suffers. At low values the material is more sensitive and considerably more violent. In addition to titanium, red phosphorus and potassium chlorates are the other major ingredients. The phosphorus-to-chlorate ratio should be between 0.5 and 2.0. The fulminating material is prepared with sufficient water to provide the desired coating thickness on the wire anvil.

The minor ingredients include a small quantity of a chemical dispersing agent, such as sodium lignin sulfonate, which promotes efficient mixing of the fulminating material without degradative mechanical milling and at the same time prevents formation of hard agglomerates. The addition of a small amount of sulfur has been found to improve shelf life and impact sensitivity of red-phosphorus based fulminating materials. The magnesium oxide is added to maintain the mixture slightly alkaline. The sodium 2-ethylhexylsulfate functions as a wetting agent and the trichlorophenol is a microbicide which is added to retard mold development and thus permit the storage of larger batches of fulminating material for longer periods of time before their actual use in the lamp manufacturing operations.

What I claim is:

1. A photoflash lamp comprising:
an hermetically sealed, light-transmitting envelope;
a quantity of filamentary combustible material located within said envelope;
a combustion-supporting gas in said envelope;
and a primer secured to and extending from one end of said envelope and in communication therewith, said primer including a charge of percussion-sensitive fulminating material having powdered titanium as one of its components.

2. The combination of claim 1 in which the principal components of the fulminating material are a fuel, an oxidizer, titanium and a binder.

3. The combination of claim 1 in which the principal components of the fulminating material are red phosphorus, potassium chlorate, titanium and a binder.

4. The combination of claim 1 in which the weight percent of titanium is between 10% and 90%.

5. The combination of claim 3 in which the phosphorus-to-chlorate ratio is between about 0.5 and 2.0.

6. The combination of claim 1 and a relatively small quantity of a chemical dispersing agent.

7. The combination of claim 6 in which said chemical dispersing agent is sodium lignin sulfonate.

8. The combination of claim 1 and relatively small quantities of a chemical dispersing agent, sulfur and magnesium oxide.

9. The combination of claim 1 and relatively small quantities of a chemical dispersing agent, sulfur, magnesium oxide, a wetting agent and a microbicide.

References Cited

UNITED STATES PATENTS

| | | | |
|---|---|---|---|
| 3,041,862 | 7/1962 | Anderson et al. | 431—95 |
| 3,046,769 | 7/1962 | Anderson et al. | 431—95 |
| 3,208,246 | 9/1965 | Goto et al. | 431—95 |
| 3,511,586 | 5/1970 | Kopelman et al. | 431—93 |
| 3,521,984 | 7/1970 | Fink et al. | 431—93 |

EDWARD J. MICHAEL, Primary Examiner